May 23, 1944. W. H. MOTZ 2,349,451
FREEZING OF LIQUIDS
Filed Nov. 26, 1940 4 Sheets-Sheet 1
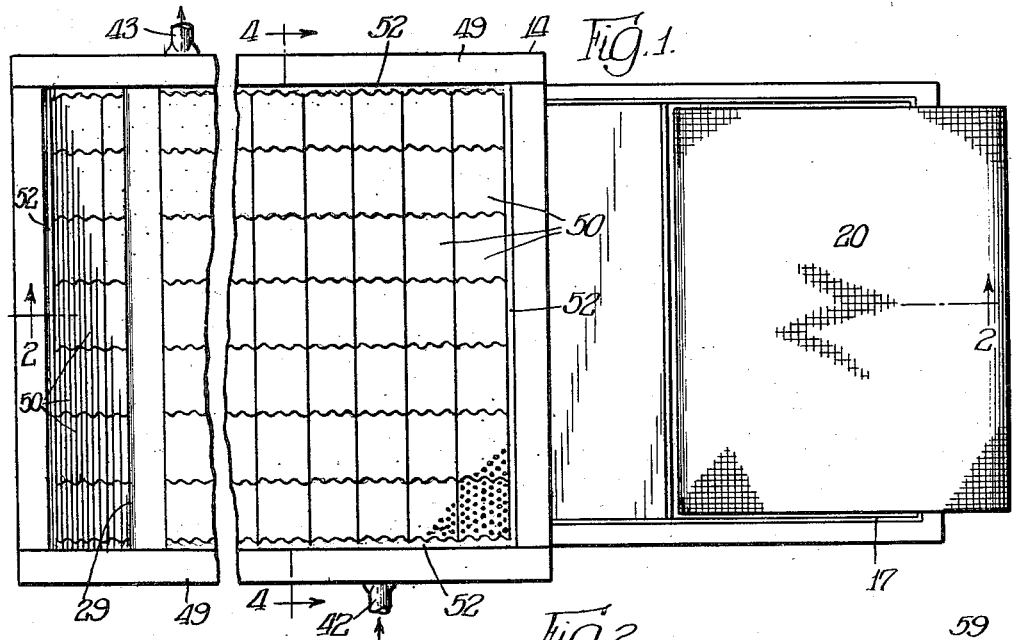
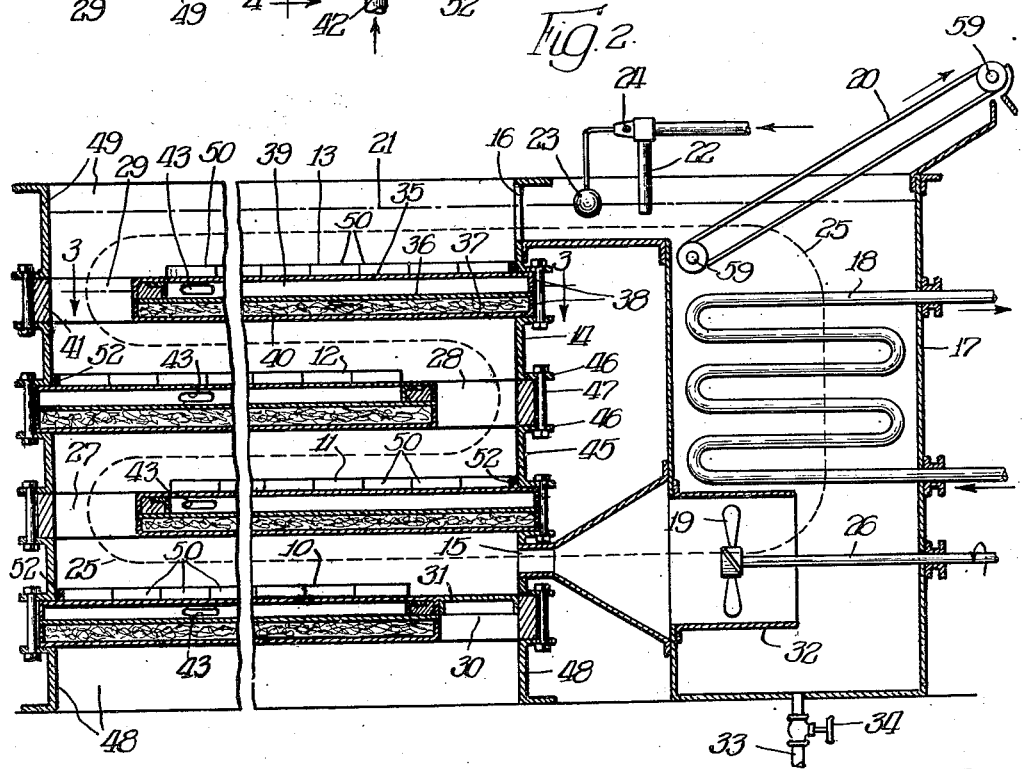
INVENTOR.
William H. Motz,
BY Cromwell, Greist + Warden
attys

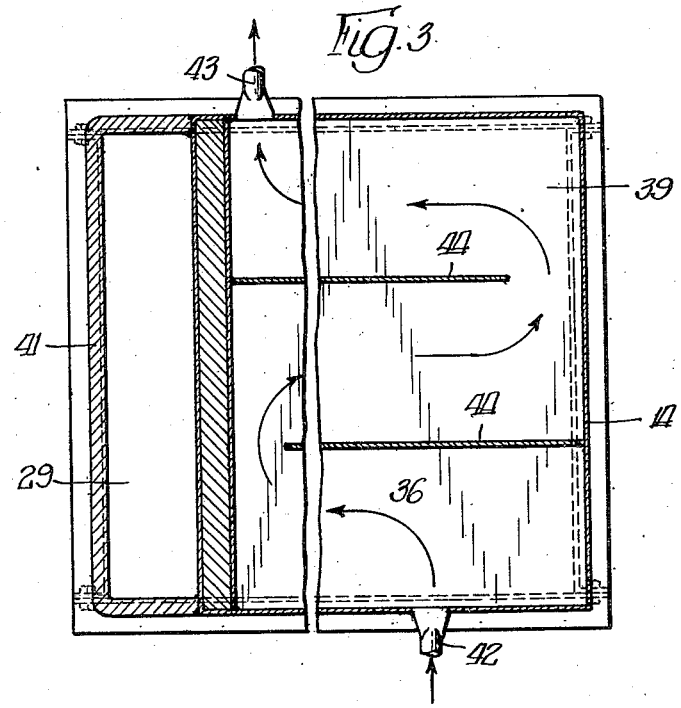
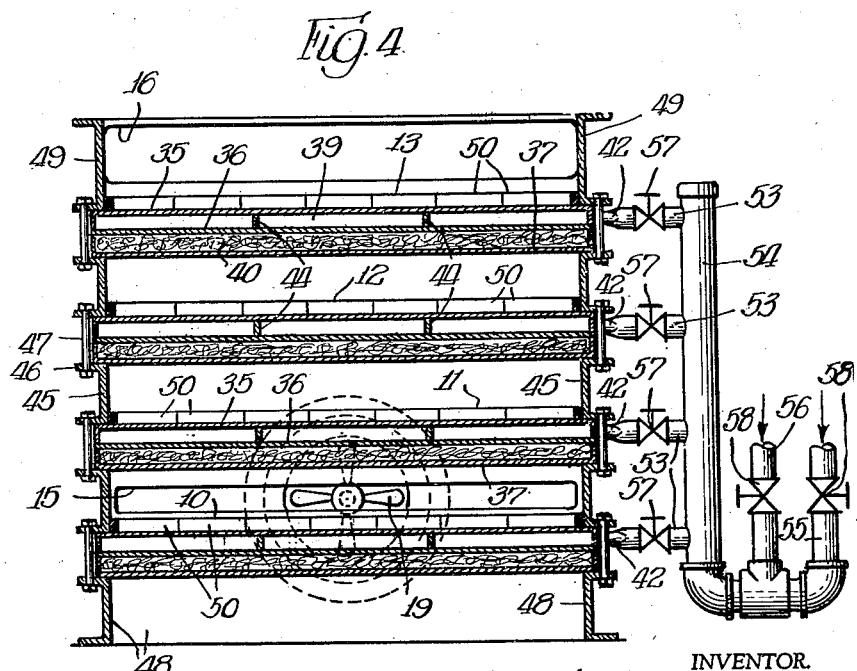

May 23, 1944.  W. H. MOTZ  2,349,451
FREEZING OF LIQUIDS
Filed Nov. 26, 1940  4 Sheets-Sheet 3
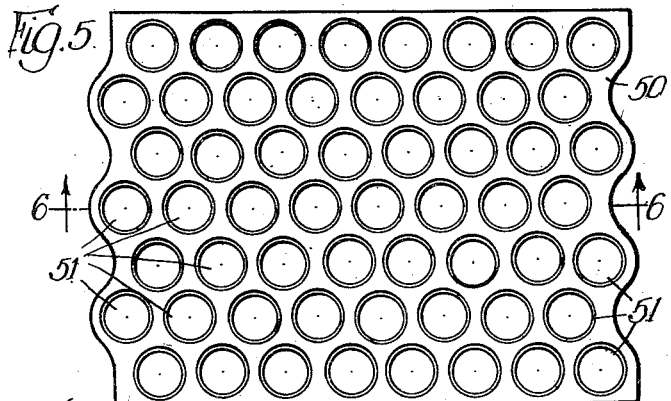
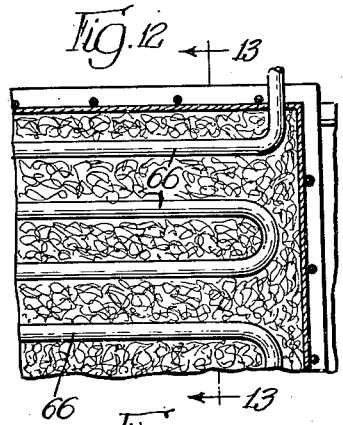
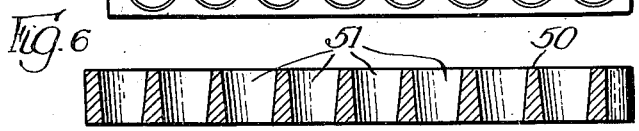
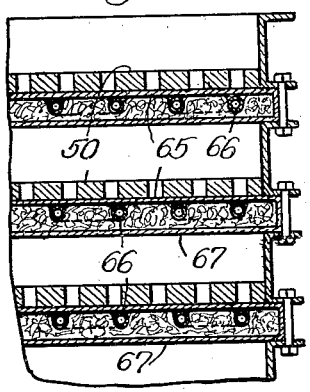
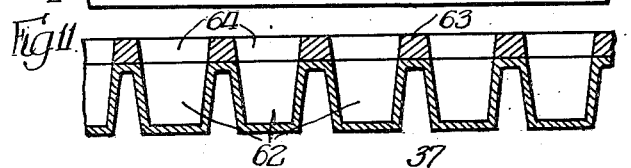
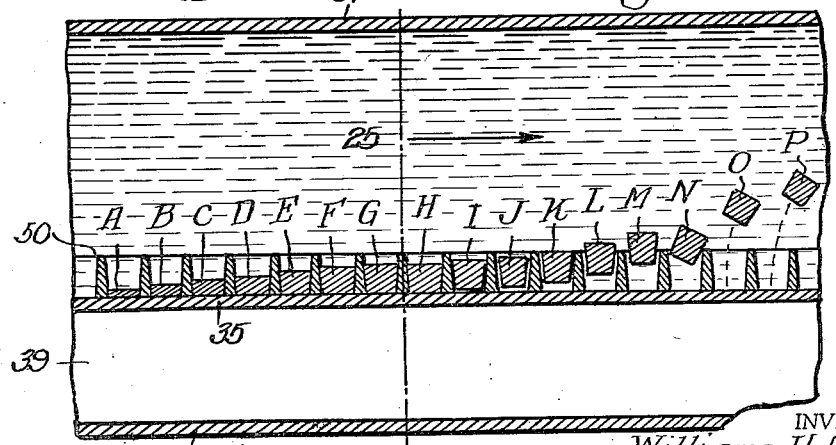
INVENTOR.
William H. Motz,
BY Cromwell, Greist & Warden
attys May 23, 1944.  W. H. MOTZ  2,349,451
FREEZING OF LIQUIDS
Filed Nov. 26, 1940  4 Sheets-Sheet 4
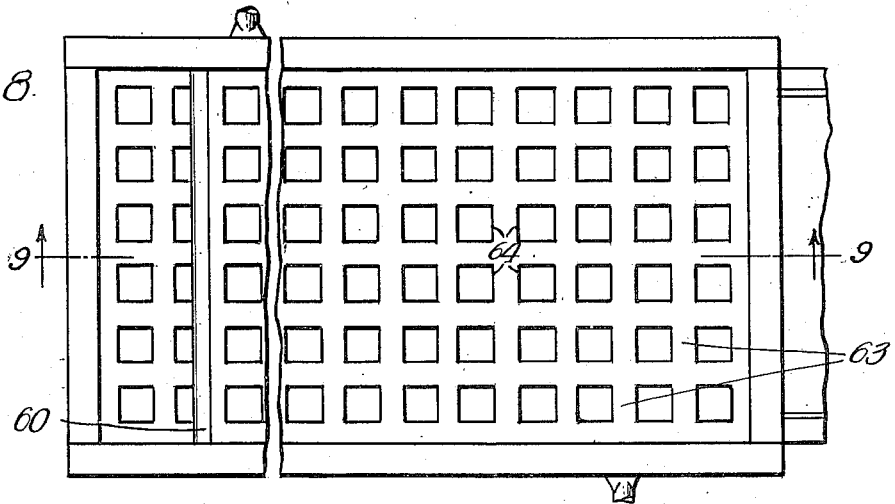
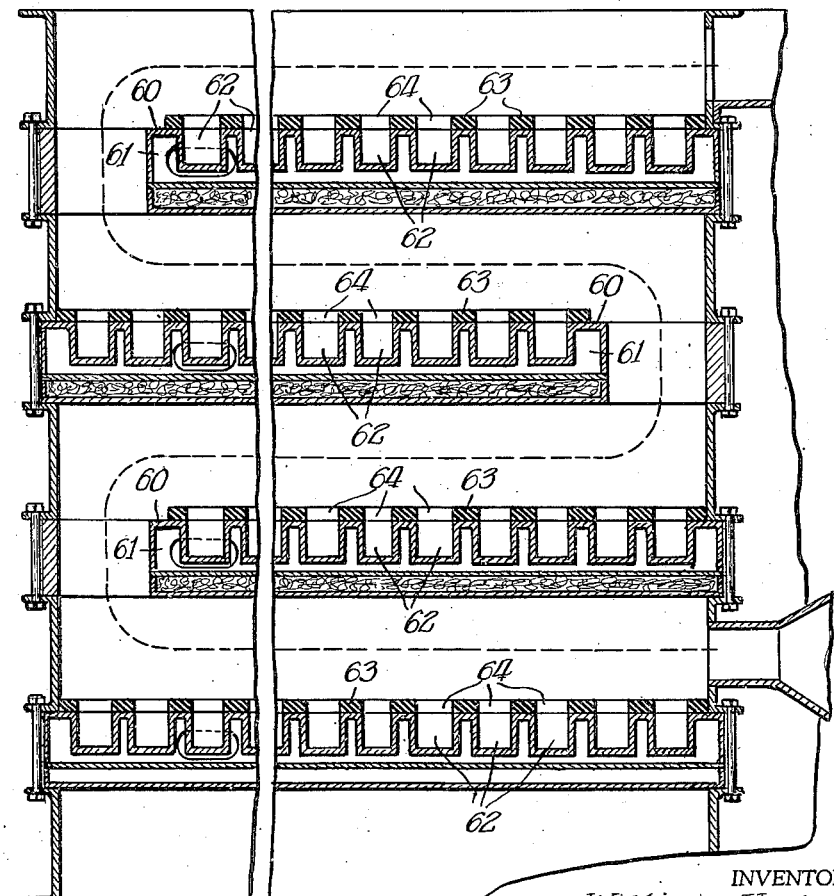
INVENTOR.
William H. Motz,
BY Cromwell, Greist + Warden
attys Patented May 23, 1944

2,349,451

UNITED STATES PATENT OFFICE 2,349,451

FREEZING OF LIQUIDS

William H. Motz, Oak Park, Ill.

Application November 26, 1940, Serial No. 367,275

10 Claims. (Cl. 62—105)

My invention has to do in a general way with refrigeration, and is particularly concerned with the production of small clear ice pellets of uniform shape and size. While of especially great value in the production of clear ice pellets, because of the large quantities of chipped, crushed and cubed ice now being used, which such pellets can advantageously replace, the invention is also applicable to the production of pellets frozen from various other liquids.

The principal object of the invention is to provide a method and apparatus for producing frozen shapes from a mother liquid. The frozen substance may or may not contain all of the original constituents of the mother liquid, depending upon the nature of the mother liquid. In freezing "raw" water, in either a softened or unsoftened state, the residual dissolved mineral matter and air are prevented from becoming included in the ice, resulting in clear ice pellets. In freezing other mother liquids, all of the original constituents are allowed to become included in the frozen substance.

Another object of the invention is to provide means, in addition to the pellet freezing means, for pre-cooling the mother liquid to or near its congealing or freezing temperature, whereby to increase the rapidity of the freezing process.

Another object of the invention is to provide means for separating the solidified shapes from the mother liquid, whereby to enable the pellets or other shapes to be harvested quickly and economically.

Heretofore, in the ice industry, clear ice has been produced in cans or cells holding normally 300 to 400 pounds of ice in one piece. After harvesting these larger pieces of ice, the same are cut, crushed, or broken into smaller non-uniform shapes for use by the consumer. My invention provides a method and means whereby clear ice is frozen directly in small uniform shapes, of a size suitable for the consumers' direct and immediate use, without any further processing. Ice produced by crushing or breaking of larger pieces has an opaque appearance, due to the irregular breaking of the crystals as well as the inclusion of very fine particles of the same. The ice pellets produced by my method and means are clear and uniform in shape, and a mass of the pellets will give a most attractive crystalline sparkling appearance. Furthermore, ice particles produced by means of crushing and breaking of larger pieces have a tendency to adhere closely together, thus forming a semi-solid mass of the smaller particles. The ice pellets produced by my method and means do not have any tendency to adhere closely together, thus facilitating the handling and use of the same, in the form of disconnected particles.

While the foregoing statements are indicative in a general way of the nature of the invention, other more specific objects and advantages will be apparent to those skilled in the art upon a full understanding of my improved method and apparatus.

A preferred embodiment of the invention, and two structurally modified forms of the same, are presented herein for the purpose of exemplification, but it will of course be appreciated that the invention is susceptible of incorporation in various other structurally modified forms coming equally within the scope of the appended claims.

In the accompanying drawings:

Fig. 1 is a plan view of an apparatus constructed in accordance with the invention, with a substantial portion of the freezing unit in the apparatus broken away and removed for compactness of illustration;

Fig. 2 is a vertical longitudinal section, through the apparatus, taken on the line 2—2 of Fig. 1;

Fig. 3 is a horizontal section through one of the freezing beds in the freezing unit, taken on the line 3—3 of Fig. 2;

Fig. 4 is a vertical transverse section through the freezing unit, taken on the line 4—4 of Fig. 1;

Fig. 5 is a plan view of one of the pellet molds;

Fig 6 is a vertical section through the pellet mold, taken on the line 6—6 of Fig. 5;

Fig. 7 is a composite progressive-stage view, which shows schematically the formation and removal of each of the pellets;

Fig. 8 is a plan view of a structurally modified freezing unit, with a substantial portion of the same broken away and removed for compactness of illustration;

Fig. 9 is a vertical longitudinal section through the freezing unit shown in Fig. 8, taken on the line 9—9 of Fig. 8;

Fig. 10 is a plan view of a portion of one of the cube molds employed in this freezing unit;

Fig. 11 is a vertical section through the cube mold, taken on the line 11—11 of Fig. 10;

Fig. 12 is a fragmentary horizontal section through one corner of another structurally modified freezing unit; and Fig. 13 is a fragmentary vertical transverse section through the upper portion of one side of the freezing unit shown in Fig. 12, taken on the line 13—13 of Fig. 12.

The apparatus shown in Figs. 1–6 inclusive of the drawings will first be described. This apparatus is characterized by a tier of upwardly opening cellular freezing beds 10, 11, 12 and 13 which are arranged horizontally one above the other in an elongated casing 14. One of the end walls of the casing 14 is provided with a liquid inlet 15 between the two lowermost freezing beds 10 and 11, and with a liquid outlet 16 above the uppermost freezing bed 13. The inlet 15 and outlet 16 communicate with a second casing 17. The casing 17 contains a cooling coil 18, a propeller 19, and an endless traveling screen 20. The casings 14 and 17 are adapted to be filled to approximately the level 21 with the liquid to be frozen. For the purpose of this description water will be referred to as the liquid to be frozen, but it will of course be understood that many other liquids can be frozen advantageously in accordance with the invention.

The water enters the apparatus through a pipe 22, and the level of the water in the apparatus is maintained substantially constant by a float 23 which controls a valve 24 in the pipe 22. The water is circulated through the apparatus in an endless stream 25, from the casing 17, into the casing 14, and back again into the casing 17. This circulation is induced by the propeller 19, which is mounted on a shaft 26 and is rotated by any suitable means.

The freezing beds 10, 11, 12 and 13 extend the full length and width of the casing 14, and the lowermost freezing bed 10 forms a water-tight bottom for the same. The other freezing beds 11, 12 and 13 are provided with end openings 27, 28 and 29, respectively, through which the stream 25 of water passes upwardly. The opening 27 is located at the far end of the casing 14, the opening 28 at the near end, and the opening 29 at the far end again. As all of the freezing beds 10, 11, 12 and 13 are preferably duplicates of each other, to simplify construction, and are merely reversed in position end for end, the lowermost freezing bed 10 contains an opening 30 which corresponds to the openings 27, 28 and 29 but which is closed off by a water-tight cover 31.

The stream of water 25, upon leaving the propeller 19, is directed through the opening 15 in the casing 14 and passes horizontally over the freezing bed 10, between the latter and the bottom of the freezing bed 11. The inlet 15 extends the full width of the casing 14, and the stream 25, in passing over the freezing bed 10, is spread across the entire width of the latter. When the stream 25 reaches the far end of the freezing bed 10 it turns upwardly through the opening 27 in the freezing bed 11 and reverses its direction of flow, passing lengthwise over the freezing bed 11 between the latter and the bottom of the freezing bed 12. After traveling the full length of the freezing bed 11 the stream 25 turns upwardly again through the opening 28 in the freezing bed 12, flows lengthwise of the freezing bed 12, reverses its direction of flow again at the opening 29 in the freezing bed 13, and travels the full length of the latter, leaving the casing 14 at the outlet 16 and entering the casing 17. The stream 25 continues horizontally a short distance in the upper portion of the casing 17, passes through the screen 20, and then turns downwardly through and about the cooling coil 18 to the entrance of a tunnel-like sleeve 32 in which the propeller 19 rotates. The water may be drained from the casings 14 and 17, whenever desired, through a pipe 33 in the bottom of the casing 17 which is normally maintained closed by a valve 34. The rate of flow of the stream 25 over the freezing beds 10, 11, 12 and 13 can be increased or decreased as desired by varying the rate of rotation of the propeller 19.

As the freezing beds 10, 11, 12 and 13 are all alike in their structural features, a description of the uppermost freezing bed 13 will suffice. This freezing bed 13 includes three sheet metal plates 35, 36 and 37 which are secured together at their margins in vertically spaced relation. The upper and lower plates 35 and 37 are provided with perpendicular edge flanges 38 which abut with the edges of the intermediate plate 36 and are welded or otherwise permanently secured to the same. The space between the upper plate 35 and the intermediate plate 36 forms a shallow compartment 39 in which a refrigerant is circulated, while the space between the intermediate plate 36 and the lower plate 37 constitutes an underlying compartment 40 in which ground cork or other suitable insulating material is confined. The plates 35, 36 and 37 terminate at the opening 29 in the freezing bed and are connected at the ends of their side edges to the ends of a U-shaped metal frame 41 of the same height as the combined plates. The compartment 39 in the freezing bed is provided with a refrigerant inlet 42 at one end of one of its sides, and is provided with a refrigerant outlet 43 at the opposite end of its other side. Between the inlet 42 and the outlet 43 the compartment 39 is provided with two or more baffles 44 for causing the refrigerant in the compartment to circulate throughout the entire area of the upper plate 35.

The freezing beds 10, 11, 12 and 13 are separated vertically with respect to each other by channel bars 45 which are bolted together at their corners. These channel bars constitute the sides and also the ends of the casing 14. The channel bars 45 are arranged with their top and bottom flanges 46 outturned, and the freezing beds are positioned between such flanges, on interposed strips of sealing material (not shown), and are rigidly clamped in place by bolts 47 which pass through such flanges outwardly of the edges of the freezing beds. Other channel bars 48 form the base of the casing 14, and still other channel bars 49 form the rim of the casing.

The upper plates 35 of the freezing beds 10, 11, 12 and 13 are surfaced with a large number of slab-like pellet molds 50, which molds form the uppermost portions of the beds and are preferably made in interfitting sections, as shown in Fig. 5. The molds 50 are provided with closely arranged apertures 51, of the shape and size of the pellets or other forms to be frozen. The apertures 51, which constitute the upwardly opening cellular portions of the beds, extend through the molds 50 from the upper to the lower surfaces of the latter and increase in cross section toward their upper ends and facilitate removal of the frozen pellets by flotation. The molds 50 rest with their lower surfaces on the upper plates 35, and packing strips 52 of sponge rubber or other material are provided about the terminal edges of the assembled mold sections for preventing the water from being frozen in the spaces which would otherwise be present about such edges.

The inlets 42 to the refrigerant compartments 39 in the freezing beds 10, 11, 12 and 13 are all connected by pipes 53 to a vertical header 54 at one side of the casing 14, and this header is connected with both a conduit 55 containing cold refrigerant and a conduit 56 containing warm refrigerant. Valves 57 are located in the pipes 53 for regulating the rate of flow of the refrigerant into each of the compartments 39 and other valves 58 are positioned in the conduits 55 and 56 for controlling the flow of the cold and warm refrigerant into the header 54. A similar arrangement (not shown) of valved pipes, header and valved conduits is connected with the refrigerant outlets 43 at the other side of the casing 14, for carrying the alternately flowing cold and warm streams of refrigerant back to their respective points of supply.

In operation, the apparatus is filled with water to the level 21, refrigerant is caused to flow through the cooling coil 18 in the casing 17, refrigerant is caused to flow through the compartments 39 in the freezing beds 10, 11, 12 and 13, and the propeller 19 is set in motion, causing the stream 25 of water to start flowing. The refrigerant employed in the cooling coil 18 and in the compartments 39 in the freezing beds may be cooled brine, but direct evaporation may be employed if desired.

By maintaining the refrigerant at a temperature below that of the freezing point of water, ice will begin to form immediately in the bottoms of the apertures 51 in the molds 50. The rapid circulation of the water in a horizontal direction over the apertures 51 will prevent dissolved mineral matter, air, or suspended organic matter from becoming interlocked among the ice crystals as they form in the apertures 51. This action results in the formation of clear ice when using "raw" water, which raw water may be either softened or unsoftened. The ice is frozen from the bottoms only of the apertures 51, that is to say it builds up on the cold upper plates 35 within the apertures 51, progressing or growing rapidly upwards until it reaches the desired height to be harvested, which height is some distance below the tops of the apertures.

When the ice in the apertures 51 has attained the desired height the cold refrigerant from the conduit 55 is shut off and warm refrigerant from the conduit 56 is turned into the compartments 39. The warm refrigerant is maintained at a temperature above that of the freezing point of water, so that heat will flow through the upper plates 35 into the material of the molds 50, causing a thin film of ice on the bottom and vertical surfaces of the pellets to melt. Because of the difference in the specific gravity of the water and ice the frozen pellets will now rise by flotation out of the apertures 51 in the molds 50, and will float along with the current of circulated water above the molds 50, rising with the current through the openings 27, 28 and 29 in the freezing beds and finally passing with the current through the outlet 16 into the casing 17. The frozen pellets in the current will then ride onto the endless screen 20, which is inclined and partially submerged in the path of the stream 25, and the screen 20 will pick up the pellets and convey them beyond the end wall of the casing 17 to a suitable storage bin (not shown). The screen 20 is mounted at its ends on rollers 59, and one of the rollers is rotated by any suitable means.

Having completed the harvest of the ice pellets, the flow of warm refrigerant to the inlets 42 is interrupted and cool refrigerant is re-admitted, starting the next operating cycle. When the residual dissolved mineral matter becomes too concentrated in the water, the latter may be wasted as required through the drain pipe 33.

The molds 50 are preferably made of a material having a specific heat conductivity somewhere between that of the mother liquid and the solidified form of the mother liquid. For example, in the case of water and ice, the specific heat conductivity of the material of the molds 50 should be between the specific heat conductivity of water (3.85) and ice (15). Porcelain, which is a substance coming within this range, has been found to give excellent results.

The function of the molds 50 when made of a specially selected material, such as porcelain, is three-fold. In the first place, it functions as a mold for forming the ice shapes; in the second place, it prevents the formation of ice on the top surface of the apertured mold; and in the third place, it assists in thawing the ice shapes in the apertures 51.

During the operation of the apparatus the water is maintained at substantially its freezing point by the cooling coil 18. The upper plates 35 of the freezing beds, and the apertured molds 50 resting on such plates have the function not only of freezing the mother liquid into small and regular forms, but also the function of thawing said forms from the surfaces of the upper plates and the sides of the apertures in the molds, thus permitting an efficient and rapid removal of the solidified forms from the mother liquid.

If it is desired for any reason to produce ice pellets which are not transparent, the operating cycle hereinbefore described remains the same, with the exception that the water circulation is interrupted during the freezing period, thus allowing the dissolved mineral matter and air to become included in the ice. The water circulation is started, however, at the end of the freezing period and throughout the harvesting period for the purpose of carrying the pellets from the various points of formation to the point where they are intercepted and bodily removed from the water.

The progressive formation of the pellets is shown schematically in Fig. 7. In this view the effect of the lapse of successive time intervals is repeated, from left to right, by the stage of formation and movement of the pellets. At A the pellet has just commenced to form. It continues its formation from B through G. At H, with the pellet completely formed, the cold refrigerant is turned off and the warm refrigerant is turned on. At I a thin film of ice has melted at the bottom and about the sides of the pellet, loosening the same, and from J through P the pellet is shown as it moves into the stream, to be carried to the point of discharge. The freezing operation is discontinued before the pellet has reached the height of the top of its aperture in the mold, to preclude the formation of any bridging ice across the top of the mold between adjoining pellets. In the thawing operation the effect of the heat transfer is to cause a thin film of the solidified pellets to melt at the bottoms and about the sides of the pellets. As soon as this thin film of liquid is produced the liquid from the circulating stream passes downwardly in the apertures about the pellets, allowing the latter to be quickly raised out of the apertures to positions where they will move off in the stream 25. Excessive melting of the solidified forms in the aperture 51 of the molds 50 is prevented by the above described action, which requires but a very small period of time as compared to the time required for freezing. Melting of the pellets is also kept at a minimum due to the fact that the specific heat conductivity of the liquid surrounding the forms in the aperture is much lower than that of the mother substance when in its frozen form.

In the modification shown in Figs. 8, 9, 10 and 11, the upper plates 60 of the refrigerant compartments 61 are shaped to form reentrant cells 62. These cells are designed to freeze the liquid in somewhat larger forms, such as ice cubes of from an inch to an inch and a half in height and width. In this modification the shapes are frozen within the cells 62, as distinguished from being frozen upon the upper surfaces of the upper plates of the refrigerant chambers. Overlying the upper plates 60 are mats 63 of insulation material, which mats are provided at the locations of the cells 62 with openings 64. The insulating mats 63 are preferably made of some material having a low heat conductivity, such as rubber, and serve to prevent the mother liquid from freezing on the upper surface of the plate 60 between the cells 62. The liquid is frozen in the cells 62, and harvested from said cells, in substantially the same way as in the first described embodiment of the invention.

In the modification shown in Figs. 12 and 13 the refrigerant compartments are dispensed with and the freezing and thawing plates 65 on which the apertured molds 50 rest are arranged in direct heat transfer relation to tortuous coils 66. The coils are welded directly to the under surfaces of the plates 65 and are connected at their ends with refrigerant inlets and outlets. The intermediate plates in the freezing units are eliminated and the space between the upper plates 65 and the lower plates 67 is filled with a suitable insulating material.

I claim:

1. In an apparatus of the character described, a plurality of upwardly opening cellular freezing beds arranged one above another in generally horizontal positions, means for causing a stream of liquid to be frozen to flow across each of the beds in succession, means for reducing the temperature of the beds to freeze the liquid in the cells, and means for raising the temperature of the beds to liberate the frozen shapes from the cells into the moving stream, said apparatus being so constructed and arranged as to utilize the moving stream to carry off the frozen shapes from all of the beds to a common point of discharge.

2. In an apparatus of the character described, a plurality of upwardly opening cellular freezing beds arranged one above another in generally horizontal positions, means for causing a stream of liquid to be frozen to flow across each of the beds in succession, means for reducing the temperature of the beds to freeze the liquid in the cells, and means for raising the temperature of the beds to liberate the frozen shapes from the cells into the moving stream, said apparatus being so constructed and arranged as to utilize the moving stream to carry off the frozen shapes from all of the beds to a common point of discharge, each of said freezing beds consisting of a plate in heat exchange relation to the temperature-reducing and temperature-raising means, and an overlying mold provided with a large number of small apertures which are closed at their bottoms by the plate and are open at their tops.

3. In an apparatus of the character described, a plurality of upwardly opening cellular freezing beds arranged one above another in generally horizontal positions, means for causing a stream of liquid to be frozen to flow across each of the beds in succession, means for reducing the temperature of the beds to freeze the liquid in the cells, and means for raising the temperature of the beds to liberate the frozen shapes from the cells into the moving stream, said apparatus being so constructed and arranged as to utilize the moving stream to carry off the frozen shapes from all of the beds to a common point of discharge, each of said freezing beds consisting of a plate in heat exchange relation to the temperature - reducing and temperature - raising means, and an overlying mold provided with a large number of small apertures which are closed at their bottoms by the plate and are open at their tops, said mold being composed of a material which has a specific heat conductivity between that of the liquid before it is frozen and that of the substance frozen from the liquid.

4. In an apparatus of the character described, an upwardly opening cellular freezing bed arranged in a generally horizontal position, means for causing a stream of liquid to be frozen to flow in a vertically and laterally confined uni-directional stream across the bed during the freezing operation, means for reducing the temperature of the bed to freeze the liquid in the cells, and means for raising the temperature of the bed to liberate the frozen shapes from the cells into the moving stream, said apparatus being so constructed and arranged as to utilize the moving stream to carry off the frozen shapes to a point of discharge.

5. In an apparatus of the character described, a plurality of upwardly opening cellular freezing beds arranged one above another in generally horizontal positions, means for causing a stream of liquid to be frozen to flow across each bed, means for reducing the temperature of the beds to freeze the liquid in the cells, and means for raising the temperature of the beds to liberate the frozen shapes from the cells into the moving stream, said apparatus being so constructed and arranged as to utilize the moving stream to carry off the frozen shapes from all of the beds to a common point of discharge.

6. In an apparatus of the character described, an upwardly opening cellular freezing bed arranged in a generally horizontal position, means for causing a stream of liquid to be frozen to flow in a laterally confined uni-directional stream across the bed during the freezing operation, means for reducing the temperature of the bed to freeze the liquid in the cells, and means for raising the temperature of the bed to liberate the frozen shapes from the cells into the moving stream, said apparatus being so constructed and arranged as to utilize the moving stream to carry off the frozen shapes to a point of discharge, said freezing bed consisting of a plate in heat exchange relation to the temperature-reducing and temperature-raising means, and an overlying mold provided with a large number of small apertures which are closed at their bottoms by the plate and are open at their tops.

7. In an apparatus of the character described, an upwardly opening cellular freezing bed arranged in a generally horizontal position, means for causing a stream of liquid to be frozen to flow in a laterally confined uni-directional stream across the bed during the freezing operation, means for reducing the temperature of the bed to freeze the liquid in the cells, and means for raising the temperature of the bed to liberate the frozen shapes from the cells into the moving stream, said apparatus being so constructed and arranged as to utilize the moving stream to carry off the frozen shapes to a point of discharge, said freezing bed consisting of a plate in heat exchange relation to the temperature-reducing and temperature-raising means, and an overlying mold provided with a large number of small apertures which are closed at their bottoms by the plate and are open at their tops, said mold being composed of a material which has a specific heat conductivity between that of the liquid before it is frozen and that of the substance frozen from the liquid.

8. A device for use in freezing a liquid into a solid of predetermined shape, said device including an apertured mold and an underlying cooling and heating plate upon which the mold is positioned, with the plate exposed through the apertures in the mold, said cooling and heating plate being constructed of metal, and said mold being constructed of a non-metallic material having a specific heat conductivity which is between that of the liquid and that of the solid.

9. In a freezing and thawing machine for producing frozen forms from a liquid, a series of freezing and thawing assemblies, said assemblies being mounted one above another and arranged so that the liquid to be frozen is circulated horizontally over each assembly successively, entering the machine at the bottom on one end and leaving at the top on one end, the circulation of liquid acting to carry the frozen forms when liberated along with the current and acting finally to carry all said forms to a point of discharge, and means at the point of discharge for removing the forms from the liquid.

10. The method of producing frozen shapes from a liquid, which consists in causing a stream of the liquid to be frozen to flow in a generally horizontal direction across a plate on which an apertured mold is positioned, with the liquid in direct contact with the plate through the apertures in the mold, reducing the temperature of the plate to cause the liquid to freeze upwardly from the plate within the apertures in the mold, and thereafter raising the temperature of the plate to cause the frozen shapes to be thawed from the plate and mold, thereby allowing the frozen shapes to float upwardly out of the apertures in the mold and be carried off in the moving stream.

WILLIAM H. MOTZ.